United States Patent Office 3,242,186
Patented Mar. 22, 1966

3,242,186
2,5-DIHYDROXYTRIPTYCYL COMPOUNDS AND PROCESSES FOR THEIR SYNTHESES
Samuel Dershowitz, Brookline, Mass., assignor to Polaroid Corporation, Cambridge, Mass., a corporation of Delaware
No Drawing. Original application July 13, 1960, Ser. No. 42,487, now Patent No. 3,065,075, dated Nov. 20, 1962. Divided and this application Apr. 5, 1962, Ser. No. 185,215
9 Claims. (Cl. 260—297)

This application is a division of application Serial No. 42,487, filed July 13, 1960 and now U.S. Patent No. 3,065,075.

This invention relates to photography and, more particularly, to novel chemical compounds, compositions and processes useful in the development of photosensitive silver halide emulsions.

One object of this invention is to provide novel chemical compounds and suitable synthesis for their preparation.

A further object of this invention is to provide novel compositions capable of developing silver halide emulsions.

Another object is to provide processes for the development of silver halide emulsions employing the novel compositions of the invention.

Other objects of this invention will in part be obvious and will in part appear hereinafter.

The invention accordingly comprises the several steps and the relation and order of one or more of such steps with respect to each of the others, and the products and compositions possessing the features, properties, and the relation of elements which are exemplified in the following detailed disclosure and the scope of the application of which will be indicated in the claims.

There is disclosed in an article by Bartlett et al., JACS, Vol. 64, pages 2649-2653 (1942), the preparation of a new compound designated as 2,5-triptycene diol. This compound may be represented by either of the following structural formulas:

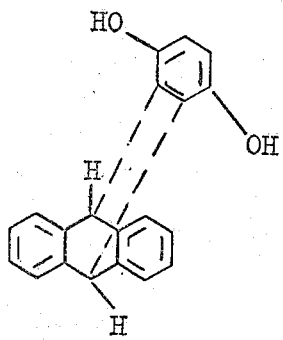

or

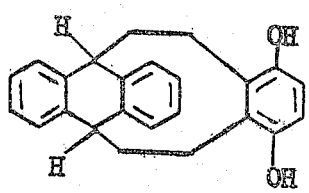

The above-mentioned compound is disclosed only as an intermediate in the preparation of triptycene, the ultimate compound sought by the authors.

It has now been discovered that 2,5-triptycene diol and its analogues are useful as agents for developing exposed silver halide emulsions.

The developing agents of this invention may therefore be represented by the following formula:

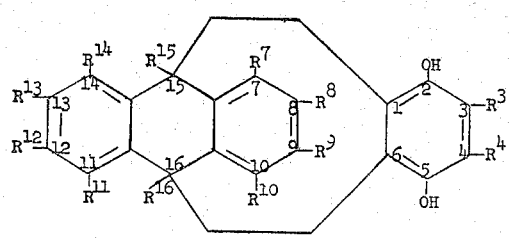

wherein: each of $R^3$, $R^4$, $R^7$, $R^8$, $R^9$, $R^{10}$, $R^{11}$, $R^{12}$, $R^{13}$, $R^{14}$, $R^{15}$, and $R^{16}$ may be the same or different and may be hydrogen, aryl, alkyl and preferably lower alkyl, halogen, amino, cyano, acetamido, acyl, nitro, carboalkoxy, carboxyl, sulfo, alkoxy, hydroxyl, carboxamido or aralkyl; either $R^3$ or $R^4$ may also be a quaternized Group V element, such as phosphorous and nitrogen; and $R^8$ together with $R^9$ and $R^{12}$ together with $R^{13}$ may comprise points of fusion of a member of the group consisting of benzene, naphthalene and polynuclear aromatic rings, fused benzene rings being preferred.

In other words, the anthracene nucleus may contain aromatic rings, such as a benzene ring, fused in the 8, 9 and/or 12, 13 positions. The aromatic rings may be substituted in the manner set forth above in the formula, and where used hereafter in the specification and claims, the expression "aromatic rings" should be construed to include within its scope the derivatives thereof.

From the foregoing formula, it will be apparent to those skilled in the art that the hydrogen atoms in the anthracene and quinone nuclei may be replaced in whole or in part with the above substituents without affecting the ability of the resulting compound to act as a developing agent for exposed silver halide emulsions.

The simplest or basic compound within the above formula, 2,5-triptycene diol, may be prepared in the manner described in the Bartlett et al. article mentioned above. That is, anthracene and quinone may be heated under reflux to obtain the adduct of anthracene and quinone. This adduct may then be dissolved in boiling glacial acetic acid and hydrobromic acid added dropwise to obtain the desired 2,5-triptycene diol. This compound, a colorless crystalline material, may be recovered from the reaction mixture by cooling and filtration.

In like manner, the various substituted anthracenes other than those having available primary or secondary amino groups and/or various substituted quinones may be employed in the above sequence of steps to obtain the corresponding analogues of 2,5-triptycene diol.

Anthrancene nuclei containing available primary or secondary amino groups should not be employed in the above reaction, since the amino group tends to react independently with the quinone and thereby hinder the desired fusion of the quinone nucleus in the 15, 16 position of the anthracene nucleus.

The amino compounds may be prepared, however, by reacting quinone and anthracene substituted in the desired position with one or more acetamido groups and thereafter hydrolyzing in routine manner to form the corresponding amine.

It is also contemplated that, where found desirable or expedient to do so, a triptycene diol may first be formed and then substituted in the proper position or positions to obtain the desired compound.

The following example illustrates the preparation of 2,5-triptycene diol.

EXAMPLE I 10.8 g. of anthracene and 7.3 g. of parabenzoquinone were heated under reflux in 65 cc. of xylene for two hours. The solid was collected on a filter and thoroughly washed with benzene. A solution of 14.1 g. of the adduct prepared above was partially dissolved in 200 cc. of boiling glacial acetic acid and 6 drops of concentrated hydrobromic acid were slowly added. The resulting mixture was boiled for 20 minutes, cooled, and the product collected by filtration, washed with water and then dried. This gave 11.7 g. of triptycene diol, a white crystalline material melting at 335–338° C.

The following examples show by way of illustration and not by limitation the preparation of novel compounds within the scope of this invention.

EXAMPLE II

*3-methyl-2,5-triptycene diol*

6.1 g. of anthracene, 4.6 g. of p-toluquinone and 50 ml. of xylene were refluxed for 4 hours. The reaction mixture was cooled and poured into 250 ml. of ligroin and the resulting precipitate collected by filtration. 3.1 g. of this adduct (M.P. 173–4° C.) were heated for 10 minutes with 75 ml. of glacial acetic acid containing 4 drops of concentrated HBr, cooled, and then poured into 300 ml. of water. The precipitate was collected and purified by dissolving in glacial acetic acid and precipitating out with water. It was a white crystalline material having the following structural formula:

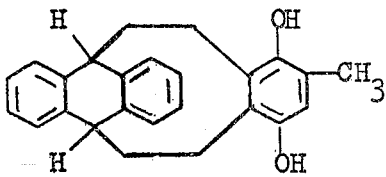

EXAMPLE III

*Benztriptycene diol*

4.56 g. of naphthacene, 2.38 g. of p-benzoquinone, and 50 ml. of xylene were refluxed for 15 hours. The reaction mixture was then cooled and 5.5 g. of an adduct were collected. The 5.5 g. of the adduct were dissolved in 100 ml. of hot glacial acetic acid. 6 drops of concentrated HBr were then added and the mixture was warmed for 10 minutes. This mixture was then poured into 500 ml. of water and 4.3 g. of benztriptycene diol were collected. It was a white crystalline material having the following structural formula:

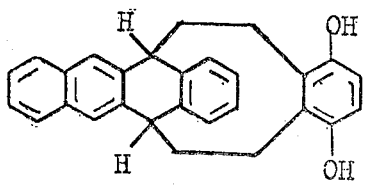

EXAMPLE IV

*2,5-dihydroxytriptycyl triphenyl phosphonium chloride*

2.7 g. of 2,5-triptycene diol were dissolved in 150 ml. of boiling glacial acetic acid. 0.6 g. of potassium bromate in 40 ml. of boiling water was then added and the mixture was boiled for 2 minutes. 40 ml. of boiling water were then added and the mixture was boiled for another 2 minutes. Upon cooling, 2.3 g. of triptycene quinone (M.P. 292–6° C.) were recovered.

To the 2.3 g. of triptycene quinone dissolved in 100 ml. of benzene, 2.3 g. of triphenylphosphine dissolved in 20 ml. of benzene were added and the mixture was stirred for 2 days. Filtration gave 4.2 g. of an adduct which was next partially dissolved in 40 ml. of methanol and then poured into 100 ml. of diluted HCl. 2.8 g. of 2,5-dihydroxytriptycyl triphenyl phosphonium chloride were recovered. It was a white crystalline material having the following structural formula:

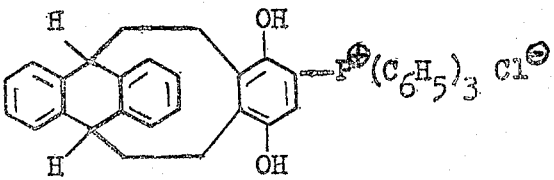

EXAMPLE V

*2,5-dihydroxytriptycyl pyridinium chloride*

2.8 g. of triptycene quinone prepared in the manner set forth in Example IV, 100 ml. of glacial acetic acid and 10 ml. of pyridine were stirred for 2 hours until complete solution took place. 30 ml. of concentrated HCl were then added and the mixture was poured into 500 ml. of water. 2.4 g. of 2,5-dihydroxytriptycyl pyridinium chloride were recovered. It was a white crystalline material having the following structural formula:

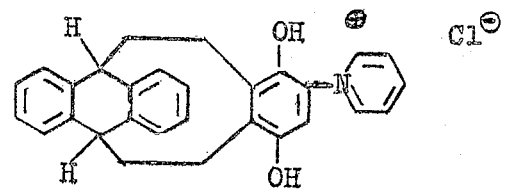

It should be apparent to the skilled worker that various derivatives of 2,5-triptycene diol may be employed in the sequence of steps defined in Examples IV and V to prepare the corresponding analogues of the pyrindinium chloride and phosphonium chloride derivatives. In other words, in lieu of 2,5-triptycene diol, one may employ as the starting material in the preparation of the pyridinium chloride and phosphonium chloride derivatives, compounds of the general formula:

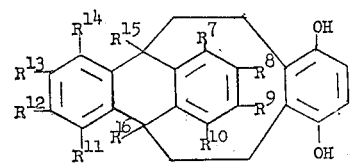

wherein each R has the meaning heretofore given.

Accordingly, the scope of the invention should not be construed as limited to the specific compounds illustrated in Examples IV and V.

The triptycene diol compounds of this invention may be used as silver halide developing agents in conventional multistage and multibath photographic processing procedures. They are also useful as silver halide developing agents in diffusion transfer processes such as those disclosed in U.S. Patent No. 2,647,056 to Edwin H. Land. When used in such transfer processes, the novel developer compositions of this invention may have incorporated therein, in addition to the conventional alkaline materials, a silver halide solvent, such as sodium thiosulfate. The silver halide developing agents of this invention are also useful as auxiliary or accelerating developing agents in processes employing dye developers, i.e., dyes which are also silver halide developing agents. Processes of this type are disclosed and claimed in U.S. Patent No. 2,983,606, issued to Howard G. Rogers.

If the composition is to be applied to the photosensitive emulsion by being spread thereon in a thin layer, it may also include a film-forming thickening agent, such as, for example, sodium carboxymethyl cellulose.

The following example is illustrative of the novel developer compositions of this invention and their use in transfer processes wherein a positive image is formed on an image-receiving element. It is to be expressly understood that the invention is not limited to the materials and proportions given by way of illustration.

EXAMPLE VI

A photosensitive element was prepared by coating a support with a solution comprising 25 cc. of an aqueous silver iodobromide emulsion, 24 cc. of methanol, 1 cc. of wetting agent and 0.4 g. of the 2,5-triptycene diol prepared in Example I. The resulting photosensitive element was exposed and processed with a processing composition comprising:

| | |
|---|---|
| Sodium carboxymethyl cellulose (medium viscosity) _____g__ | 20 |
| Sodium hydroxide _____g__ | 11.25 |
| Sodium thiosulfate _____g__ | 11.97 |
| Water _____cc__ | 265.5 |

The above processing composition was spread between the exposed photosensitive element and an image-receiving element as the elements were brought into superposed relationship. The image-receiving element comprised a support carrying an image-receiving layer in which silver precipitating agents were dispersed. After an imbibition period of approximately 1 minute, the elements were separated and the image-receiving element contained a positive silver transfer image.

It will be apparent that the relative proportions of the novel developing agents and the other ingredients of the above developer composition may be varied to suit the requirements of the operator. Thus, it is within the scope of this invention to modify the above developer composition by the substitution of preservatives or alkalies other than those specifically mentioned. It is also contemplated that, where desirable, the above developer composition may be modified by the inclusion of other common components of developer compositions, such as restrainers, accelerators, etc.

Since certain changes may be made in the above products, compositions and processes without departing from the scope of the invention herein involved, it is intended that all matter contained in the above description shall be interpreted as illustrative and not in a limiting sense.

What is claimed is:

1. A compound of the formula:

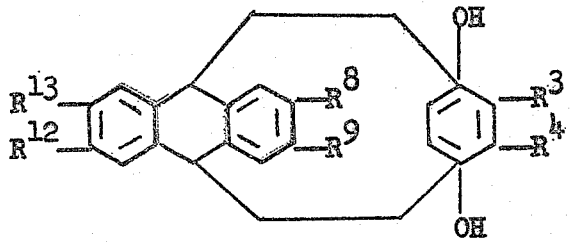

wherein $R^3$ is selected from the group consisting of phosphonium and pyridinium radicals; $R^4$ is selected from the group consisting of hydrogen and lower alkyl; and $R^8$, $R^9$, $R^{12}$ and $R^{13}$ are hydrogen, provided that each of $R^8$ and $R^9$ together and $R^{12}$ and $R^{13}$ together may comprise points of fusion of a member of the group consisting of benzene and naphthalene rings.

2. Compounds as defined in claim 1, wherein $R^3$ is $-P(C_6H_5)_3^{\oplus}$ $Cl^{\ominus}$.

3. 2,5-dihydroxytriptycyl triphenyl phosphonium chloride.

4. The process of preparing 2,5-dihydroxytriptycyl triphenyl phosphonium chloride which comprises: (1) reacting triptycene quinone and triphenyl phosphine and recovering the adduct thereof; and (2) reacting said adduct with triphenyl phosphonium chloride and recovering 2,5-dihydroxytriptycyl triphenyl phosphonium chloride.

5. Compounds as defined in claim 1, wherein $R^3$ is

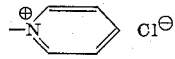

6. 2,5-dihydroxytriptycyl pyridinium chloride.

7. The process of preparing 2,5-dihydroxytriptycyl pyridinium chloride which comprises: (1) reacting triptycene quinone and pyridine to obtain the adduct thereof; and (2) adding hydrochloric acid to the reaction mixture to obtain 2,5-dihydroxytriptycyl pyridinium chloride.

8. A compound of the formula:

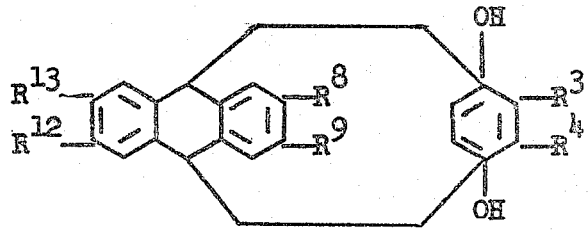

wherein $R^3$ is selected from the group consisting of hydrogen and phosphonium and pyridinium radicals; $R^4$ is selected from the group consisting of hydrogen and lower alkyl; and $R^8$, $R^9$, $R^{12}$ and $R^{13}$ may be hydrogen, provided that at least one of $R^8$ and $R^9$ together or $R^{12}$ and $R^{13}$ together comprise points of fusion of a member of the group consisting of benzene and naphthalene rings.

9. Benztriptycene diol.

References Cited by the Examiner

Bartlett et al.: J. Am. Chem. Soc., vol. 64, pp. 2649 to 2653 (1942).

Hurd: Chem. Abstracts, vol. 50, cols. 1720–1721 (1956).

TOBIAS E. LEVOW, *Primary Examiner.*

LEON D. ROSDOL, *Examiner.*